United States Patent [19]
Klein

[11] Patent Number: 5,931,937
[45] Date of Patent: *Aug. 3, 1999

[54] SYMMETRIC PARALLEL MULTI-PROCESSING BUS ARCHITECTURE

[75] Inventor: Dean A. Klein, Eagle, Id.

[73] Assignee: Micron Electronics, Inc., Nampa, Id.

[*] Notice: This patent is subject to a terminal disclaimer.

[21] Appl. No.: 08/948,802

[22] Filed: Oct. 10, 1997

Related U.S. Application Data

[63] Continuation of application No. 08/758,059, Nov. 27, 1996, Pat. No. 5,805,841, which is a continuation of application No. 08/374,894, Jan. 19, 1995, abandoned, which is a continuation of application No. 07/735,259, Jul. 24, 1991, abandoned.

[51] Int. Cl.[6] .................................................. G06F 9/46
[52] U.S. Cl. ............................. 710/269; 710/260
[58] Field of Search .................... 395/742, 733, 395/737; 710/269, 260, 264

[56] References Cited

U.S. PATENT DOCUMENTS

| | | | |
|---|---|---|---|
| 3,866,181 | 2/1975 | Gayman et al. | 395/725 |
| 3,881,174 | 4/1975 | Barnich | 395/325 |
| 4,209,838 | 6/1980 | Alcorn, Jr. et al. | 395/299 |
| 4,302,808 | 11/1981 | Zanchi et al. | 395/296 |
| 4,332,011 | 5/1982 | Epstein et al. | 395/275 |
| 4,417,302 | 11/1983 | Chimienti et al. | 395/737 |
| 4,451,881 | 5/1984 | Grice et al. | 395/300 |
| 4,504,906 | 3/1985 | Itaya et al. | 395/325 |
| 4,564,899 | 1/1986 | Holly et al. | 395/325 |
| 4,604,500 | 8/1986 | Brown et al. | 379/269 |
| 4,768,149 | 8/1988 | Konopik et al. | 395/275 |
| 5,133,056 | 7/1992 | Miyamori | 395/737 |
| 5,201,051 | 4/1993 | Koide | 395/725 |
| 5,265,255 | 11/1993 | Bonevento et al. | 395/725 |
| 5,805,841 | 11/1998 | Klein | 395/299 |

*Primary Examiner*—Ayaz R. Sheikh
*Assistant Examiner*—Theresa L. Davis
*Attorney, Agent, or Firm*—Dorsey & Whitney LLP

[57] ABSTRACT

An apparatus for and method of coupling a number of data processing components onto a bus for communication amongst the components with a symmetric parallel multi-processing bus system architecture. The bus architecture is particularly applicable to micro computer systems for the interconnection of processing units, memories, and peripherals. The function of arbitration is distributed within the users of the bus permitting ease of coupling relatively slow and fast devices to the same bus. Bus access priority may be easily modified either semi-permanently or by way of rotation.

4 Claims, 6 Drawing Sheets

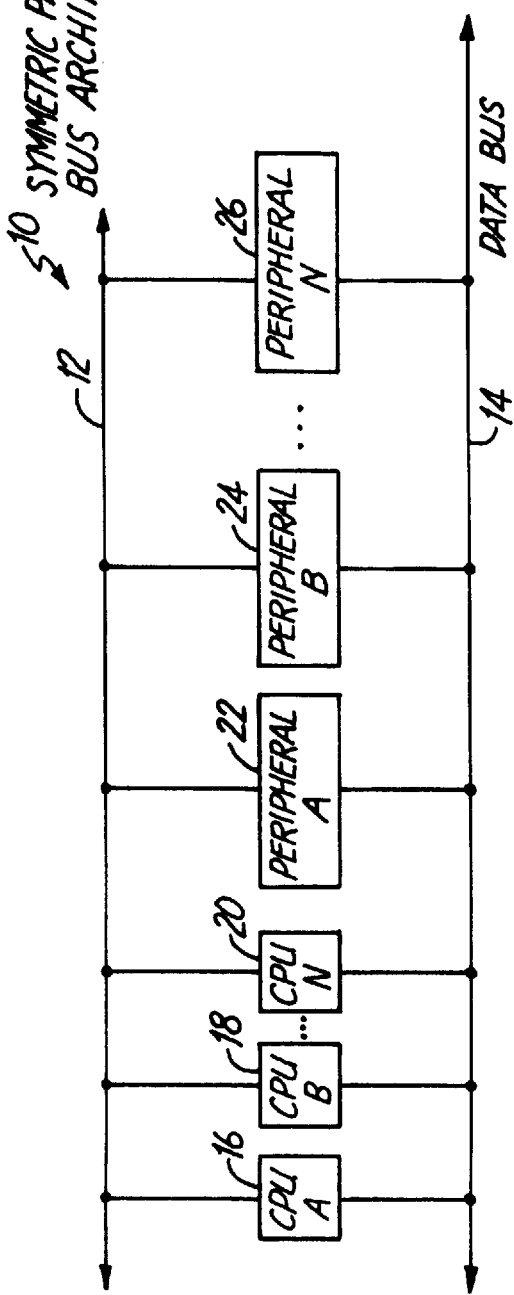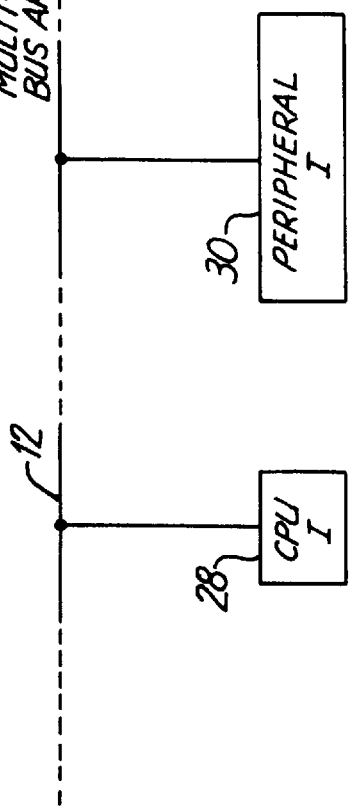

SYMMETRIC PARALLEL MULTI-PROCESSING BUS ARCHITECTURE

CROSS REFERENCE TO CO-PENDING APPLICATIONS

This is a continuation of application Ser. No. 08/758,059, filed on Nov. 27, 1996, now U.S. Pat. No. 5,805,841, which is a continuation of application Ser. No. 08/374,894, filed Jan. 19, 1995, now abandoned, which is a continuation of Ser. No. 07/735,259, filed on Jul. 24, 1991, now abandoned. This application hereby fully incorporates by reference originally filed application Ser. Nos. 08/758,059, 08/374, 894, and 07/735,259, including any appendices and drawings filed with those applications.

BACKGROUND OF THE INVENTION

1. Field of the Invention

The present invention relates generally to digital data processing systems, and more particularly, relates to bus architectures for communication amongst individual components of digital data processing systems with a symmetric parallel multi-processing bus architecture.

2. Description to the Prior Art

The simplest method of coupling individual components of a data processing system conceptually is using point-to-point connections. Using this technique, each component may communicate with each other component on a noninterference basis over any convenient format. U.S. Pat. No. 4,514,823 issued to Mendelson et al., describes one of many formats available for point-to-point communication.

As the number of devices which must intercommunicate becomes relatively large, it becomes more economical to have multiple devices share a common communication bus. The primary advantage of the bus architecture is that an individual device is able to communicate with a large number of different devices using a single, shared interface (i.e. the bus interface). The disadvantage of the bus architecture is that the bus becomes a resource which must be shared by a potentially large number of users. If more than one user needs to use the bus at the same time, a scheme needs to be developed which arbitrates or awards use of the bus to one of the multiple requestors based upon priority or some other factor.

Most bus arbitration techniques employ a centralized bus controller or arbiter. This function is often collocated with a particular one of the devices using the bus (e.g., a central processor, an input/output controller, etc.). U.S. Pat. No. 4,375,639 issued to Johnson Jr. discusses a bus arbitration scheme based on the use of a "master" device located on the bus. Embodying the bus arbitration function within a microprocessor is shown in U.S. Pat. No. 4,580,213 issued to Hulett et al.

A major disadvantage of a bus architecture system having a centralized arbiter is in the area of fault tolerance. For that reason, U.S. Pat. No. 4,402,040 issued to Evett discusses a bus architecture wherein the arbitration function is distributed amongst the individual devices using the bus. U.S. Pat. No. 4,620,278 issued to Ellsworth et al., describes another approach to distribution of the arbitration function. In either case, however, the activity of the individual devices must be synchronized to perform the arbitration function.

The necessity to synchronize distributed bus arbitration has resulted in prior art systems in which interrupt signals tend to be processed as discrete point-to-point communications, because interrupts are by nature asynchronous. This means that separate point-to-point interrupt interfaces are required.

SUMMARY OF THE INVENTION

The general purpose of the present invention is to provide a symmetric parallel multi-processing bus architecture.

The present invention overcomes the disadvantages found in the prior art by providing a bus architecture which efficiently couples transfers from devices of radically different speeds to other devices of high speed. This is particularly advantageous in transferring interrupt vector information to a processing unit, because the sending devices will ordinarily have radically different operating speeds. The technique has all of the advantages of distributing the arbitration function, and yet does not require synchronization to substantially slow the arbitration process to accommodate the slowest device on the bus.

The transfer of an interrupt vector notifies the interrupted processor of the software to be executed in response to a particular interrupt, rather than any other possible interrupt. The interrupting devices share a single wire ored control line to signify the presence of an interrupt to the processor. After the processor has prepared to accommodate the interrupt by storing the machine state, it responds to all devices on the bus with an interrupt acknowledge signal. The devices place interrupt vector data on the bus and each read the bus to determine whether higher priority interrupt vectors are present. Whenever a device determines that higher priority interrupt vectors are present on the bus, it removes its own interrupt vector. Only the highest priority interrupt vector remains on the bus for execution by the processor.

This technique takes advantage of all of the benefits of a bussed architecture using distributed arbitration for multiple asynchronous devices of differing speeds. An important feature is that it permits efficient handling of bussed interrupt vectors.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 is a conceptualized block diagram of a distributed digital data processing system employing a bus architecture;

FIG. 2 is a simplified block diagram showing interrupt communication between a single processor and a single peripheral device;

DETAILED DESCRIPTION OF THE PREFERRED EMBODIMENTS

FIG. 1 is a conceptualized block diagram of a digital data processing system 10 having a plurality of processors and a plurality of other devices. CPU A 16, CPU B 18, . . . , CPU N 20 comprise the plurality of processors. Peripheral A 22, Peripheral B 24, . . . . Peripheral N 26 comprise the plurality of other devices.

Each of the processors and each of the other devices is coupled to data bus 14 which is common in the art. It may utilize any of the standardized protocols or may employ a unique protocol depending upon the application. Each of the processors and each of the other devices is also coupled to symmetric parallel multi-processing bus 12 according to the present invention. Amongst the functions to be accomplished by symmetric parallel multi-processing bus 12 are the transfer of data and control signals amongst the plurality of processors and plurality of other devices.

FIG. 2 is a simplified block diagram of Peripheral I 30 coupled to CPU I 28 via symmetric parallel multi-processing bus 12 for the transfer of an interrupt and interrupt vector. A single line (IRQZ) to CPU I 28 from symmetric parallel multi-processing bus 12 is used by all peripheral devices, including Peripheral I 30 to notify cPU I 28 that an interrupt is requested. Whenever CPU I 28 is prepared for the interrupt by storing the machine state, etc., it sets the bus status signals in the proper state to acknowledge, readiness to receive an interrupt.

Upon receipt of the interrupt acknowledge state signals, each peripheral desiring to interrupt CPU I 28, including Peripheral I 30, places its unique interrupt vector on the data lines of symmetric parallel multi-processing bus 12. An interrupt vector is used by CPU I 28 to branch to a software program appropriate to the handling of the associated interrupt. Because the interrupt vectors are unique, each can be used to identify a given interrupting peripheral device if necessary. Because each peripheral may have more than one unique interrupt vector, a given peripheral device, such as Peripheral I 30, can generate more than one type of interrupt.

Peripheral I 30 waits to allow the bus to settle then begins to read the data lines of the symmetric parallel multi-processing bus 12 to determine whether any higher priority interrupt vectors are present as explained in more detail below. If any higher priority interrupt vector is read, Peripheral I 30 removes its interrupt vector from the data lines of symmetric parallel multi-processing bus 12.

If no higher priority interrupt vector is read, Peripheral I 30 maintains interrupt vector until the interrupt acknowledge state on the bus is removed. This represents that the interrupt vector has been read by CPU I 28, and the processor has begun processing of the requested interrupt.

Figure 3:
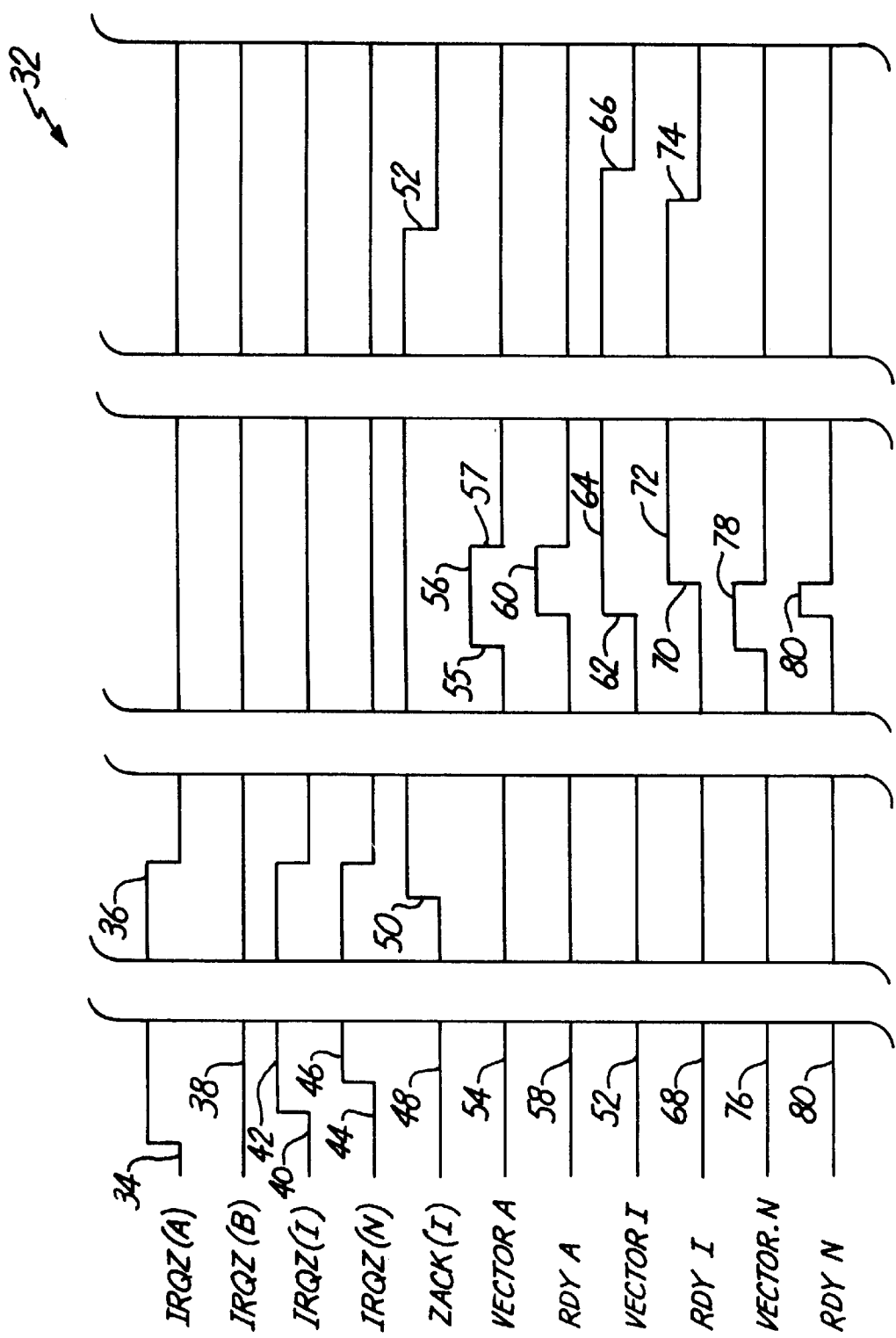
FIG. 3 is a graphical representation of the timing of arbitration and communication of an interrupt vector.

FIG. 3 is a graphical representation 32 of the major timing of the signals of symmetric parallel multi-processing bus 12 associated with the transfer of an interrupt and corresponding interrupt vector.

Line 34 is the interrupt request line (IRQZ) as viewed by Peripheral A 22 (see also FIG. 1). Pulse 36 shows the timing and duration of the interrupt request to CPU 1 28 from Peripheral A 22. Line 38 shows that Peripheral B 24 makes no interrupt request at this time. Line 40 is the interrupt request line from Peripheral I 30. Pulse 42 shows the presence and timing of an interrupt request from Peripheral I 30. Similarly pulse 46 on line 44 shows the interrupt request from Peripheral N 26. It should be noted that the line IRQZ for CPU I 28 is shared with all of the peripherals, and the lines 34, 38, 40, and 44 show the interrupt request only from the point of view of the driver within and individual peripheral.

Line 48 shows the timing of signal ZACK from CPU I 28. The interrupt acknowledge begins at leading edge 50 and terminates at trailing edge 52. The setting of ZACK acknowledges to the appropriate peripherals that it is prepared to process an interrupt. Resetting of ZACK indicates that the processor has read the interrupt vector, and is in the process of executing the software associated with that interrupt.

Pulse 56 of line 54 having leading edge 55 and trailing edge 57 is the time frame during which Peripheral A 22 places its unique interrupt vector of the common data lines of symmetric parallel multi-processing bus 12. Leading edge 55 corresponds to the time after the reading of leading edge 50 of the ZACK signal is read and Peripheral A 22 is able to gate the interrupt vector onto the data lines. Trailing edge 57 indicates the time at which Peripheral A 22 removes its interrupt vector from symmetric parallel multi-processing bus 12 because it has read the data lines and has found a higher priority interrupt vector to be present.

Line 58 shows the RDY signal from Peripheral A 22. Signal 60 is presented to indicate the validity of the interrupt vector placed on the data lines of symmetric parallel multi-processing bus 12 as indicated by pulse 56. When signal 60 is dropped because a higher priority interrupt vector is present on the bus, the interrupt vector data is no longer valid as can be seen by trailing edge 57.

The interrupt vector from Peripheral I 30 is placed on the data lines of symmetric parallel multi-processing bus 12 as shown by line 62. The duration of pulse 64 is sufficiently long to effect transfer to CPU I 28, because for this situation the interrupt vector of Peripheral I 30 is the highest priority. This is true even though leading edge 62, occurs later in time than leading edge 55 of pulse 56. Line 68 shows the RDY signal of Peripheral I 30. Note that leading edge 70 occurs sufficiently after leading edge 62 to ensure that the data has stabilized. Also note that trailing edge 74 occurs before trailing edge 66 to guarantee validity of the interrupt vector data.

The interrupt vector data of Peripheral N 26, shown by line 76 and pulse 78, along with the RDY signal shown by line 80 and pulse 82 function similar to the corresponding signals from Peripheral A 22.

Figure 4:
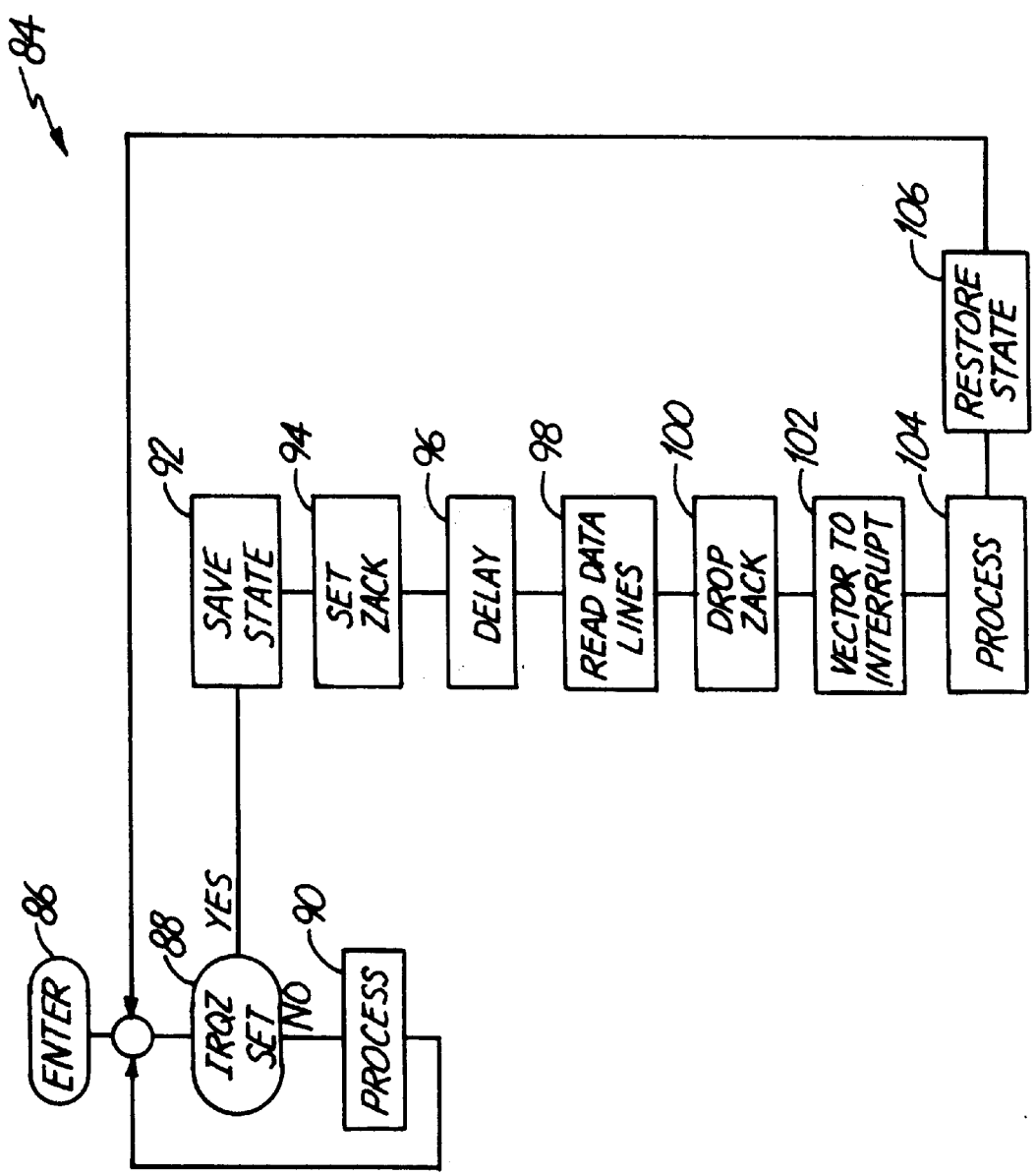
FIG. 4 is a flowchart for the operation of the processor in receiving an interrupt vector.

FIG. 4 is a conceptualized flowchart of the operation of cPU I 28 during the receipt of an interrupt. The logic is entered at element 86. Element 88 determines whether the incoming interrupt request line (IRQZ) is set. If not, element 90 shows that normal processing continues. Whenever element 88 finds that IRQZ is set, element 92 saves the machine state. The entry into the interrupt mode is signalled to the users of symmetric parallel multi-processing bus 12 by element 94 which sets ZACK. Element 96 represents the delay present in the system which will ordinarily be overlapped with other processing functions.

During the delay of element 96, the peripherals requesting an interrupt of CPU I 28 will have sensed the setting of ZACK, placed the unique interrupt vectors on the data lines of symmetric parallel multi-processing bus 12, and arbitrated use of the bus with all but the highest priority interrupter having left the bus.

At element 98, CPU I 28 reads the interrupt vector from the highest priority requester. Element 100 drops the ZACK signal signifying that the interrupt vector has been read. The interrupt vector directs control of CPU I 28 at element 102, and the interrupt processing is accomplished at element 104. Element 106 restores the state of CPU I 28, and control is returned to determine whether another interrupt or normal processing will resume.

Figure 5:
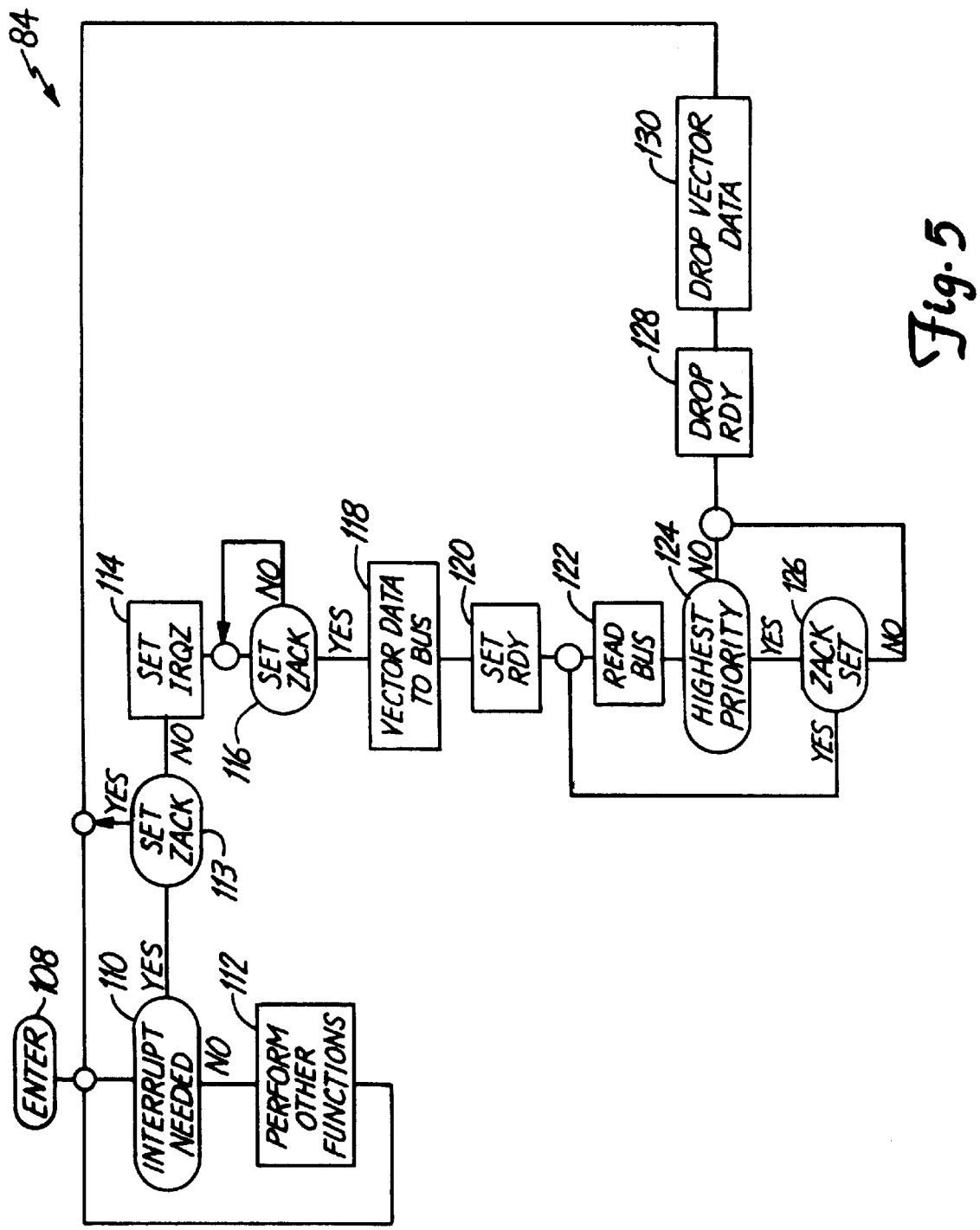
FIG. 5 is a flowchart for the operation of a peripheral device during the transmission of an interrupt vector.

FIG. 5 is a conceptualized flowchart of the logic of Peripheral I 30 as it completes transfer of the interrupt vector to CPU I 28. The logic is entered at element 108. Element 110 determines if an interrupt is required. If not, element 112 performs the non-interrupt processing. If an interrupt is required, control is transferred to element 113 which determines if ZACK is currently set. If ZACK is set, an interrupt transfer sequence is in process from another requester, and control is returned to element 110.

If an interrupt transfer sequence is not in process, element 114 sets the interrupt request line, IRQZ. Element 116 retains control until CPU I 28 sets the ZACK line. It is necessary to wait at this point until CPU I 28 acknowledges that it is ready to receive an interrupt vector. The interrupt vector is placed on the data lines of symmetric parallel multi-processing bus 12 and by element 118. After stabilization of the data lines, element 120 sets the RDY signal. At this point in time, the interrupt vector has been prepared for transfer and arbitration of symmetric parallel multi-processing bus 12 begins.

The arbitration function involves reading of the data lines of symmetric parallel multi-processing bus 12 by element 122. Element 124 determines whether a higher priority interrupt vector is on the data lines of symmetric parallel multi-processing bus 12. If a higher priority interrupt vector is found, control is transferred to element 128. However, as long as element 124 finds no higher priority interrupt vector, element 126 continues to monitor whether the ZACK signal remains. If yes, the arbitration function continues. If not, the transfer of the interrupt vector has been completed and control is given to element 128.

Whether the arbitration process has shown a higher priority interrupt vector to be present or the interrupt vector transfer has been completed, element 128 drops the RDY signal. The interrupt vector data is dropped by element 130. Control returns to element 110 to determine whether an interrupt is needed.

Figure 6:
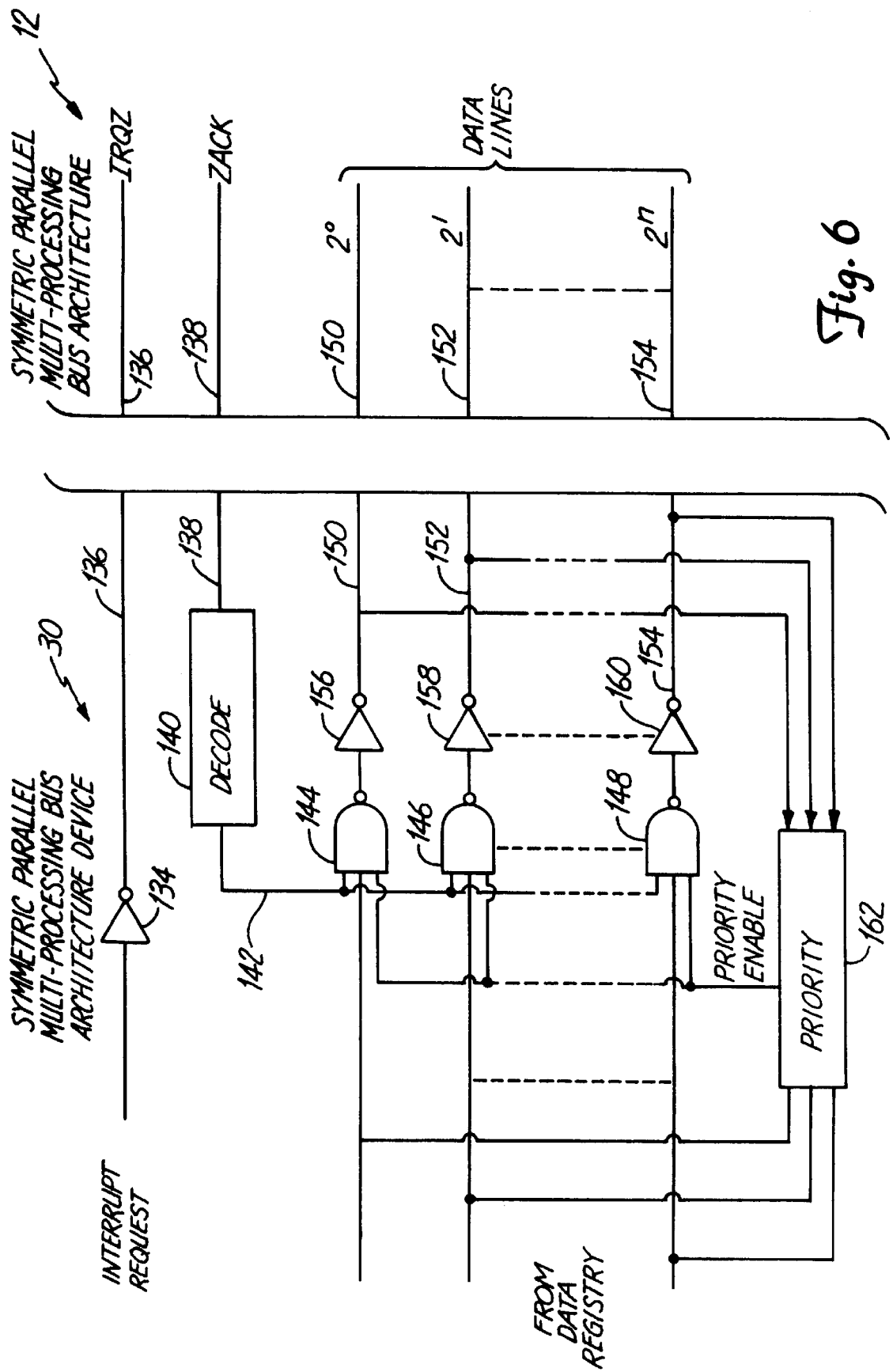
FIG. 6 is a detailed diagram showing the bus interface of a peripheral device; and, FIG. 7 is a table showing the arbitration analysis.

FIG. 6 is a diagram showing the key components of the interface between Peripheral I 30 and symmetric parallel multi-processing bus 12. Interrupt request line 136 or IRQZ is a single control line shared by all of the symmetric parallel multi-processing bus users for a particular processor. The ZACK signal is applied to line 138 which is from a single processor to each user of symmetric parallel multi-processing bus 12. The ZACK signal is received and decoded by decode 140. The decoded ZACK signal is used to enable and gates 144, 146, . . . , 148 to place data (i.e. the interrupt vector) onto symmetric parallel multi-processing bus 12. When enabled, the data is actually placed on symmetric parallel multi-processing bus 12 by bus drivers 156, 158, . . . , 160. Because data lines 150, 152, . . . , 154 are used in common by a number of users, they must be driven by open collector drivers and require standard pull up resistors (not shown).

Data lines 150, 152, . . . , 154 are read by priority circuit 162 at the appropriate time to determine whether a higher priority interrupt vector is present. Priority circuit 162 compares the interrupt vector of Peripheral I 30 with the contents of the data lines of symmetric parallel multi-processing bus 12 as shown. If ever a higher priority interrupt vector is present, priority circuit 162 disables and gates 144, 146, . . . , 148.

Figure 7:
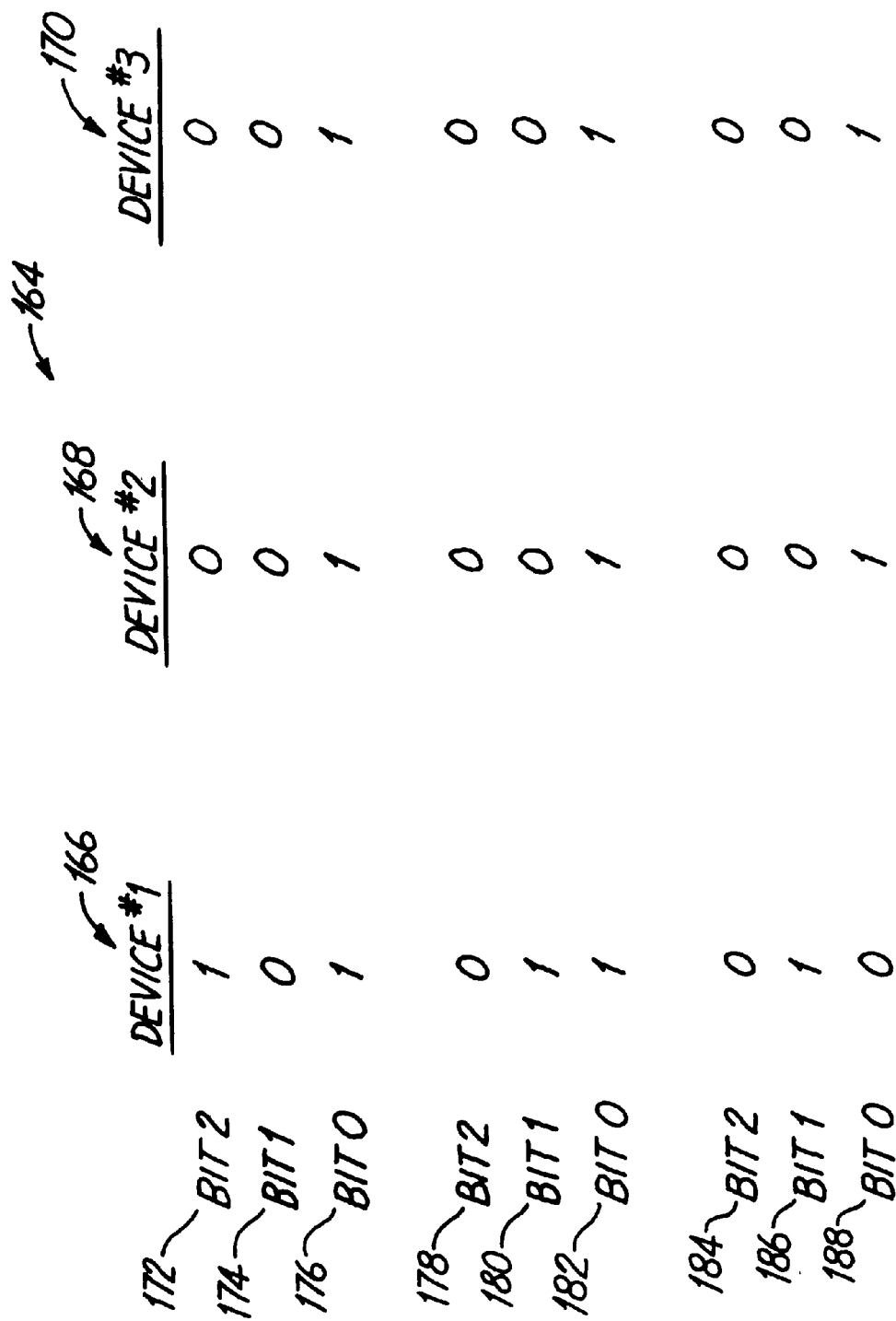

FIG. 7 is a table showing the manner in which priority circuit 162 determines whether or not a higher priority interrupt vector is present. Column 166 is the contribution of Peripheral I 30. Column 168 shows the contribution of another user of symmetric parallel multi-processing bus 12 requesting transfer of an interrupt. Column 170 shows to result of arbitration as seen on symmetric parallel multi-processing bus 12.

As a matter of convenience and not to be thought as limiting the present invention, three bit interrupt vector codes are used. Rows 172, 174, and 176 show the three bit positions for a first example. Rows 178, 180, and 182, along with rows 184, 186, and 188 show the three bit positions for a second and third example, respectively.

Having thus described the preferred embodiments of the present invention, those of skill in the art will be readily able to apply the teachings found herein to yet other embodiments within the scope of the claims hereto attached.

What is claimed is:

1. A digital data processing system comprising:

a communication bus having a plurality of common interrupt lines;

a plurality of processors coupled to said communication bus, wherein each of said plurality of processors is coupled to a different one of said common interrupt lines;

a plurality of peripheral devices coupled to said communication bus and coupled to said common interrupt lines;

each peripheral device having means for transferring an interrupt signal to any one of said processors on the corresponding common interrupt line of said communication bus;

means in each peripheral device for placing a unique interrupt vector containing priority information on the communication bus together with any interrupt vectors placed by other peripheral devices;

means in each peripheral device for determining whether its interrupt vector has the highest priority among the interrupt vectors placed on the communication bus for a given processor and for removing its interrupt vector if it does not have the highest priority for the given processor; and means in at least one peripheral device for generating more than one type of interrupt signal.

2. A digital bus communication system comprising:

a data bus for carrying data;

a communication bus for carrying communication information;

a plurality of processors coupled to the data bus for transfer of data and coupled to the communication bus for transfer of communication information;

multiple peripheral devices, each coupled to the data bus for transfer of data and coupled to the communication bus for transfer of communication information and each having means for placing a unique interrupt vector containing interrupt priority information on said communication bus together with any interrupt vectors placed by other peripheral devices and further having means for determining whether its interrupt vector has the highest priority among the interrupt vectors placed on the communication bus for a given processor and for removing its interrupt vector if it does not have the highest priority for the given processor, and wherein at least one peripheral device further comprises means for generating more than one type of interrupt vector; and the communication bus having a single common interrupt line for each of the plurality of processors which is shared by all peripheral devices, each peripheral device including means for transferring an interrupt signal on the interrupt line to each of the processors.

3. In a digital data processing system having a communication bus, a plurality of processors coupled to said communication bus, and a plurality of peripheral devices coupled to said communication bus, a method for handling interrupts from said peripheral devices, comprising:

providing a plurality of common interrupt lines for communication between each peripheral device and the plurality of processors;

from each peripheral device having need for interrupt service, transferring an interrupt signal to one of the plurality of processors on one of said common interrupt lines of said communication bus;

for each peripheral device having need for interrupt service, placing a unique interrupt vector containing priority information on the communication bus together with any interrupt vectors placed by other peripheral devices;

determining in each peripheral device whether its interrupt vector has the highest priority among the interrupt vectors placed on the communication bus for a given processor and removing its interrupt vector if it does not have the highest priority for the given processor; and generating more than one type of interrupt signal for at least one of the peripheral devices.

4. A data processing system comprising:

a communication bus having a plurality of common interrupt lines;

a plurality of processors coupled to the communication bus, wherein each of the processors is coupled to a different one of the common interrupt lines;

a plurality of peripheral devices coupled to the communication bus and the common interrupt lines;

circuitry located within each peripheral device that transfers an interrupt signal to any one of the processors on the common interrupt line for that processor;

circuitry located within each peripheral device that places on the communication bus an interrupt vector that is unique to each peripheral device and that includes priority information; wherein the interrupt vector is placed on the communication bus together with any interrupt vectors placed on the communication bus by other peripheral devices;

circuitry located within each of the peripheral devices that determines whether the interrupt vector for its peripheral device has the highest priority among the interrupt vectors placed on the communication bus for a given processor, and that removes the interrupt vector for its peripheral device if the interrupt vector does not have the highest priority for the given processor; and circuitry located within at least one peripheral device that generates more than one type of interrupt vector.

* * * * *